(12) United States Patent
Kamada

(10) Patent No.: US 11,421,458 B2
(45) Date of Patent: Aug. 23, 2022

(54) BONNET HINGE STRUCTURE

(71) Applicant: Honda Motor Co., Ltd., Tokyo (JP)

(72) Inventor: Tomohito Kamada, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/403,808

(22) Filed: Aug. 16, 2021

(65) Prior Publication Data

US 2022/0074247 A1  Mar. 10, 2022

(30) Foreign Application Priority Data

Sep. 7, 2020 (CN) .......................... 202010928214.0

(51) Int. Cl.
| | |
|---|---|
| *E05D 5/04* | (2006.01) |
| *E05D 11/00* | (2006.01) |
| *E05D 3/14* | (2006.01) |
| *B60R 21/38* | (2011.01) |

(52) U.S. Cl.
CPC .............. *E05D 5/043* (2013.01); *B60R 21/38* (2013.01); *E05D 3/145* (2013.01); *E05D 11/00* (2013.01); *E05D 2011/009* (2013.01); *E05Y 2900/536* (2013.01)

(58) Field of Classification Search
CPC ... E05D 3/145; E05D 11/00; E05D 2011/009; E05D 5/043; E05D 2005/067; B60R 21/38; E05Y 2900/536
See application file for complete search history.

(56) References Cited

U.S. PATENT DOCUMENTS

| | | | | |
|---|---|---|---|---|
| 7,802,345 | B2 * | 9/2010 | Mathew | E05D 15/46 296/193.11 |
| 8,863,879 | B1 * | 10/2014 | Domlovil | B62D 25/12 180/69.2 |
| 10,697,217 | B2 * | 6/2020 | Sawada | E05D 5/043 |
| 2013/0227818 | A1 * | 9/2013 | Zippert | B60R 21/38 16/366 |
| 2019/0383074 | A1 * | 12/2019 | Schabenberger | E05D 5/0207 |
| 2021/0129789 | A1 * | 5/2021 | Steinbrecher | E05D 11/06 |

FOREIGN PATENT DOCUMENTS

JP  2018058451  4/2018

\* cited by examiner

*Primary Examiner* — Jeffrey O'Brien
(74) *Attorney, Agent, or Firm* — JCIPRNET

(57) ABSTRACT

The disclosure provides a bonnet hinge structure. The bonnet hinge structure pivotally supports the bonnet to the vehicle body from the rear end of the bonnet, and includes: a lower hinge member fixed to the vehicle body; an upper hinge member fixed to the bonnet fixing portion of the bonnet, and pivotally connected to the lower hinge member in a manner of being able to rotate to a first height relative to the lower hinge member in the up-down direction of the vehicle body; and a rotation suppressing portion provided with a deviation restricting member. When the upper hinge member is deformed in the left-right direction of the vehicle body, the deviation restricting member comes into contact with the upper hinge member at a position of the second height lower than the first height from the top of the upper hinge member, and prevents the upper hinge member from rotating.

7 Claims, 8 Drawing Sheets

BONNET HINGE STRUCTURE

CROSS-REFERENCE TO RELATED APPLICATION

This application claims the priority benefit of China application serial no. 202010928214.0, filed on Sep. 7, 2020. The entirety of the above-mentioned patent application is hereby incorporated by reference herein and made a part of this specification.

BACKGROUND

Field of the Disclosure

The disclosure relates to a bonnet hinge structure, in particular to a bonnet hinge structure of a vehicle.

Description of Related Art

The bonnet hinge structure of a vehicle is used to rotatably support the bonnet with respect to the body of the vehicle, so that the bonnet can open and close an engine room provided at the front of the vehicle. A conventional bonnet hinge structure, as in Patent Document 1, includes a hinge base and a hinge arm that are rotatably connected. The hinge base has an arm support portion and is fixed to the vehicle body at the rear of the engine room. One end of the hinge arm is fixed to the bonnet support portion, and the other end is rotatably supported by the arm support portion with a rotation shaft extending in the vehicle width direction as a center.

In Patent Document 1, the bonnet hinge structure of a vehicle that rotatably supports the bonnet is adopted. When an external force acts on the connection portion of the hinge piece located on the hinge leaf (hinge arm) externally from the outside in the vehicle width direction, the locking claw of the hinge leaf and the engagement plate portion of the hinge base are engaged with each other, so that the engagement plate portion restricts the hinge leaf from moving toward the outside in the vehicle width direction behind the front edge portion of the hinge leaf support portion.

LITERATURE OF RELATED ART

Patent Literature

[Patent Document 1] Japanese Laid-open No. 2018-058451

In conventional technologies, such as the bonnet hinge structure of Patent Document 1, when a vehicle is impacted in an accident such as a collision or an impact, and an external force acts on the bonnet support portion of the hinge arm in the left-right direction of the vehicle body, the locking claw of the hinge arm and the engagement plate portion of the hinge base are engaged with each other. Through such engagement, it is possible to suppress the hinge arm from moving toward the inside in the left-right direction of the bonnet support portion, so as to prevent the connection between the hinge arm and the hinge base from breaking.

However, when a vehicle is involved in an accident such as a collision or an impact, a bonnet hinge structure that can resist external forces from any direction and maintain the position of the bonnet is required, and the bonnet hinge structure needs to be simplified in structure and be able to stably hold the position of the bonnet in all directions.

In view of the above, a bonnet hinge structure that can stably hold the position of the bonnet in all directions regardless of the external force coming from the front-rear direction or the left-right direction in the event of a collision or impact is provided in this disclosure.

SUMMARY OF THE DISCLOSURE

The disclosure provides a bonnet hinge structure, which pivotally supports the bonnet at the vehicle body from the rear end of the bonnet, and the bonnet hinge structure includes a lower hinge member, an upper hinge member and a rotation suppressing portion. The lower hinge member is fixed to the vehicle body. The upper hinge member is fixed to a bonnet fixing portion of the bonnet, and is pivotally connected to the lower hinge member in a manner of being able to rotate to a first height relative to the lower hinge member in the up-down direction of the vehicle body. The rotation suppressing portion is provided with a deviation restricting member. When the upper hinge member is deformed in the left-right direction of the vehicle body, the deviation restricting member is in contact with the upper hinge member at a position of the second height that is lower than the first height from the top of the upper hinge member, and prevents the upper hinge member from rotating.

In order to make the above-mentioned features and advantages of the disclosure more obvious and comprehensible, the following embodiments are specially provided and are described in detail with reference to the accompanying drawings as follows.

DESCRIPTION OF EMBODIMENTS

With reference to the drawings, a bonnet hinge structure embodied in various embodiments of the disclosure will be described below. FR in each drawing represents the front in the front-rear direction of the vehicle, UP represents the upper side in the up-down direction of the vehicle, and IN represents the inner side in the left-right direction of the vehicle. In addition, the directions and positions described in the specification of the disclosure are all defined on the premise that the front of the vehicle is facing the front direction.

Figure 1:
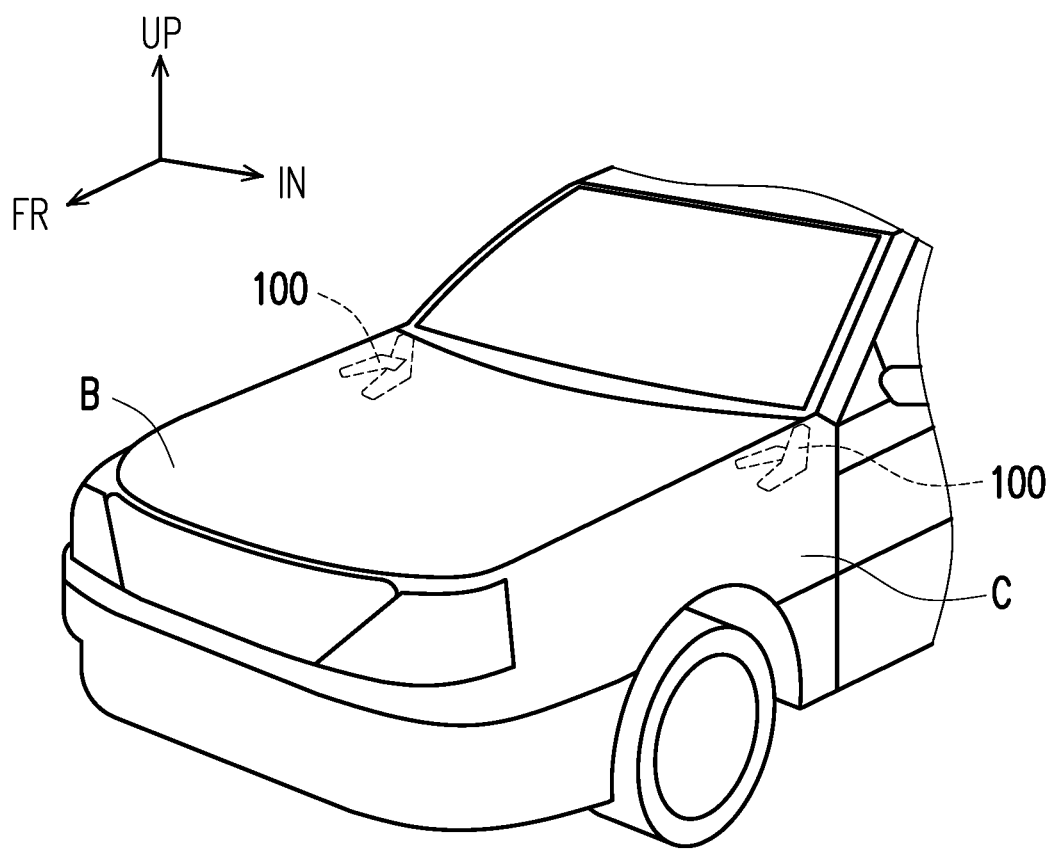
FIG. 1 is a schematic view schematically showing a vehicle provided with a bonnet hinge structure according to an embodiment of the disclosure.
Figure 2:
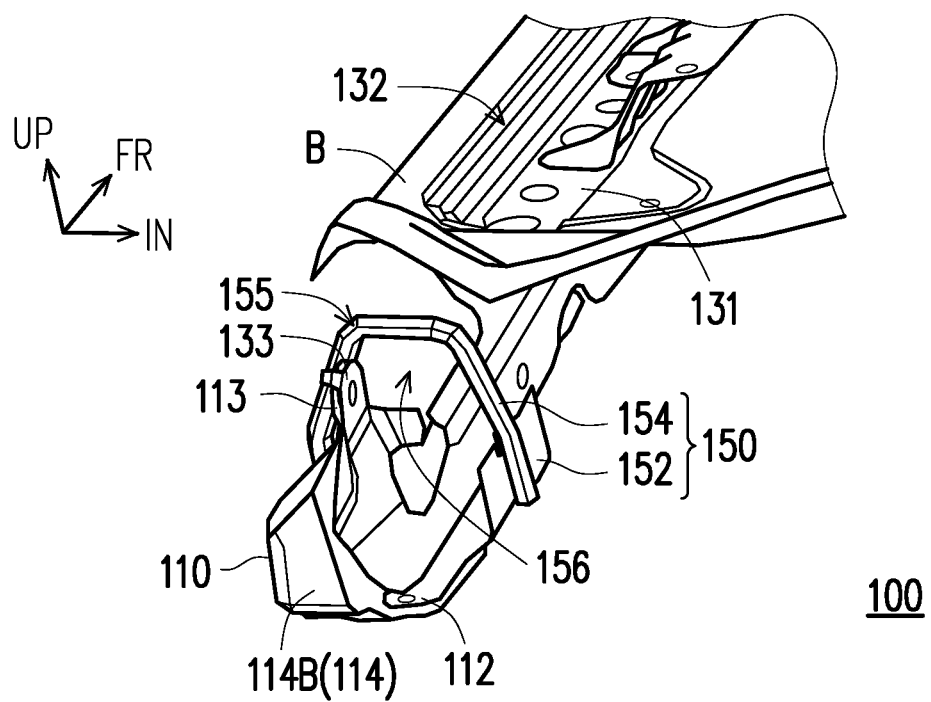
FIG. 2 is a schematic view showing a bonnet hinge structure according to an embodiment of the disclosure.
Figure 3:
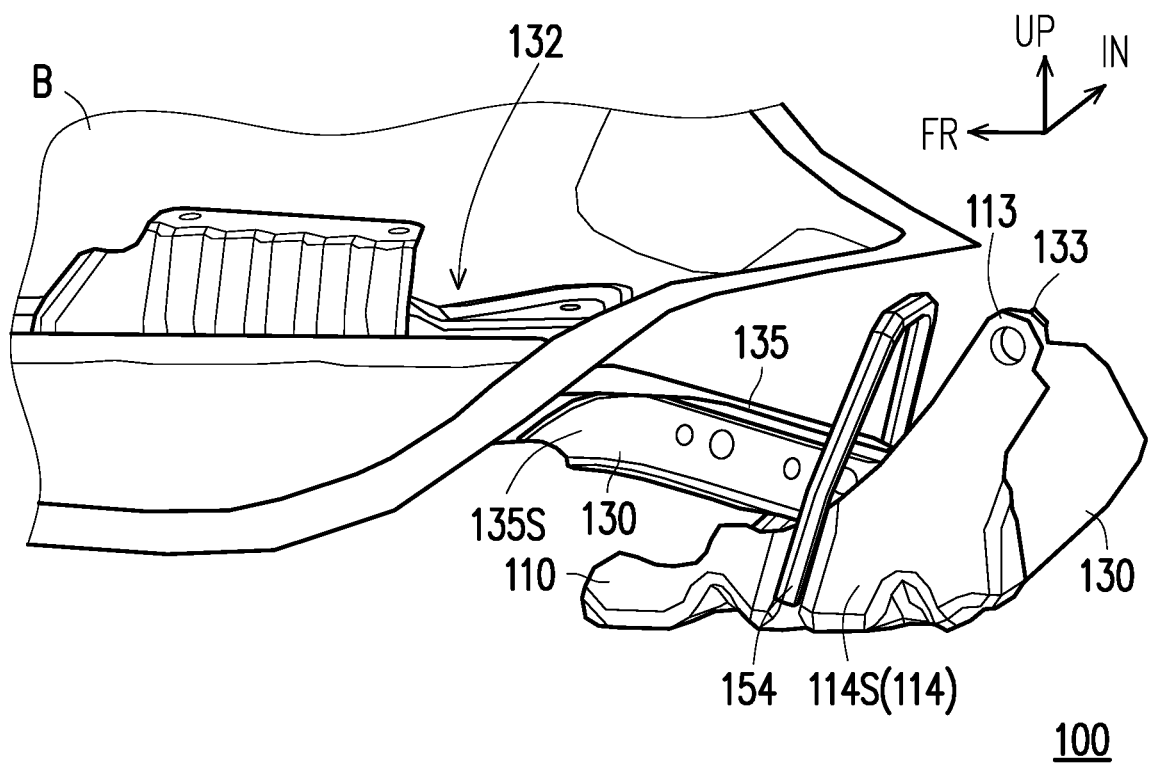
FIG. 3 is a schematic view of the bonnet hinge structure of FIG. 2 viewed from another angle.
Figure 4:
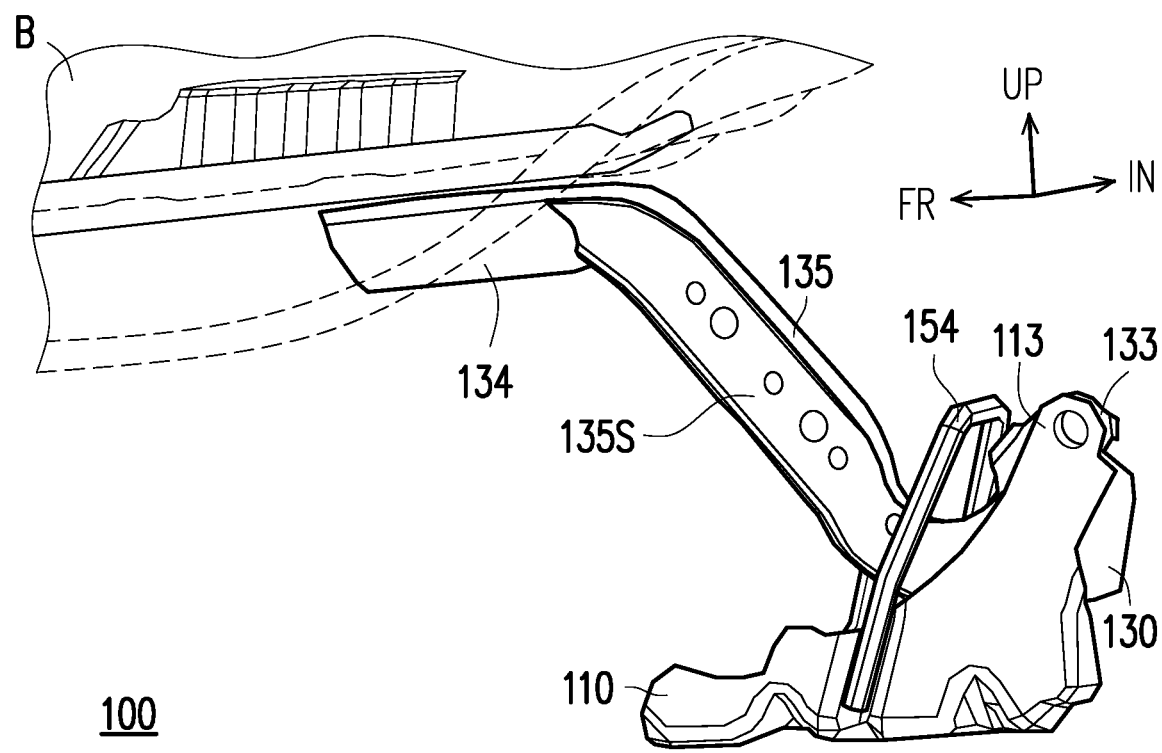
FIG. 4 is a schematic view showing a state in which the bonnet of the bonnet hinge structure of FIG. 2 is opening.
Figure 5:
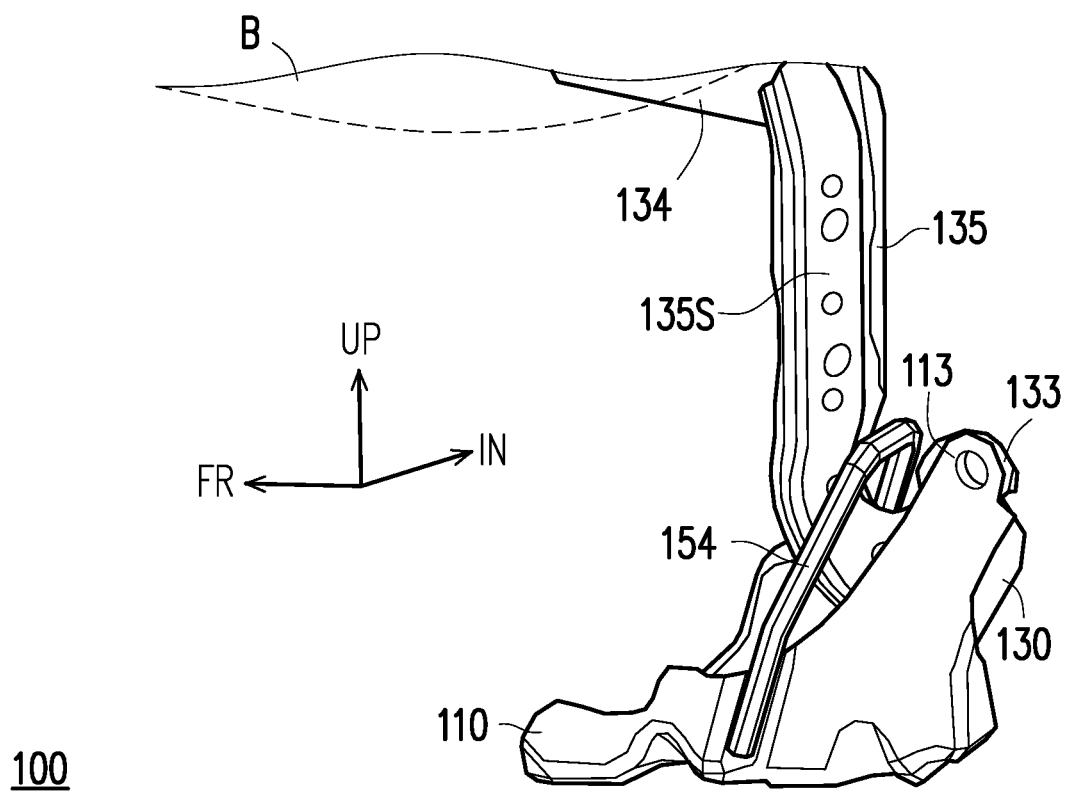
FIG. 5 is a schematic view showing a state in which the bonnet of the bonnet hinge structure of FIG. 2 is completely opened.

FIG. 1 is a schematic view schematically showing a vehicle provided with a bonnet hinge structure according to an embodiment of the disclosure. FIG. 2 is a schematic view showing a bonnet hinge structure according to a first embodiment of the disclosure. FIG. 3 is a schematic view of the bonnet hinge structure of FIG. 2 viewed from another angle. FIG. 4 is a schematic view showing a state in which the bonnet of the bonnet hinge structure of FIG. 2 is opening. FIG. 5 is a schematic view showing a state in which the bonnet of the bonnet hinge structure of FIG. 2 is completely opened.

As shown in FIG. 1 and FIG. 2, the bonnet hinge structure 100 is disposed in an engine room at the front of the vehicle, and is configured to rotatably support the bonnet B with respect to the vehicle body C of the vehicle, so that the bonnet B can open and close an engine room. The bonnet hinge structure 100 rotatably supports the bonnet B on the vehicle body C from the rear end of the bonnet B. In the embodiment of the disclosure, two bonnet hinge structures 100 are arranged in the engine room in a symmetrical manner, and the bonnet B is rotatably supported by the two bonnet hinge structures 100 from the left and right sides as an example.

The bonnet hinge structure 100 includes a lower hinge member 110 fixed to the vehicle body C, an upper hinge member 130 fixed to a bonnet fixing portion 132 of the bonnet B, and a rotation suppressing portion 150 having a deviation restricting member 152. The upper hinge member 130 is pivotally connected to the lower hinge member 110 in the up-down direction of the vehicle body C so as to be rotatable to a first height relative to the lower hinge member 110. Under normal circumstances, when the bonnet B is opened by the user, the upper hinge member 130 can be rotated to the first height to support the bonnet B through the upper hinge member 130 fixed on the bonnet fixing portion 132 and the pivoting arrangement fixed between the lower hinge member 110 fixed on the vehicle body C. The first height reached by the upper hinge member 130 after rotation is substantially the position when the bonnet B is opened by the maximum angle.

The bonnet hinge structure 100 further includes a rotation suppressing portion 150, which has a deviation restricting member 152. When the upper hinge member 130 is deformed in the left-right direction of the vehicle body C, the deviation restricting member 152 comes into contact with the upper hinge member 130 at a position of the second height that is lower than the first height from the top of the upper hinge member 130, and prevents the upper hinge member 130 from rotating. When an accident such as a collision or an impact occurs and the front of the vehicle is subjected to an external force, the external force is transmitted by the bonnet B to cause the upper hinge member 130 to withstand the external force in the front-rear direction. Accordingly, the upper hinge member 130 will move in the left-right direction of the vehicle body (that is, the lateral direction of vehicle) due to deformation. With this movement, even if the upper hinge member 130 rotates upward, under the circumstances, the deviation restricting member 152 will stop the upper hinge member 130 from the top of the upper hinge member 130, so that the movement of the upper hinge member 130 is suppressed by the deviation restricting member 152. As such, it is possible to prevent the upper hinge member 130 from continuously rotating upward. In this manner, when an accident such as a collision or an impact occurs and the front of the vehicle is subjected to external forces, through the function performed by the deviation restricting member 152 of the rotation suppressing portion 150, it is possible to prevent the upper hinge member 130 from further rotating upward. In this manner, it is possible to effectively hold the position of the bonnet B in the up-down direction and the front-rear direction stably.

As shown in FIG. 2 and FIG. 3, in this embodiment, for example, the fixing end 131 of the upper hinge member 130 is fixed to the bonnet fixing portion 132, and the bonnet fixing portion 132 is located on the left and right sides of the bonnet B on a side close to the windshield W of the vehicle. The fixing method may be performed by using a screw locking method, a riveting method, a welding method, or the like, and the disclosure is not limited thereto. The lower hinge member 110 is composed of a vehicle body fixing portion 112, a pivot portion 113, and a plate portion 114. The vehicle body fixing portion 112 is configured to fix the lower hinge member 110 to the vehicle body C. In this embodiment, for example, the vehicle body fixing portion 112 is located at a position directly below the bonnet B. The fixing method may be performed by using screw locking, a riveting method, or a welding method, and the disclosure is not limited thereto. The lower hinge member 110 is pivotally connected to the pivot end 133 of the upper hinge member 120 through the pivot portion 113. In this embodiment, the pivot end 133 of the upper hinge member 130 may be rotatably connected with respect to the pivot portion 113 of the lower hinge member 110 through a pivot (schematically shown as the pivot A in the figure).

As shown in FIG. 3 to FIG. 5, under normal circumstances, when the user opens the bonnet B, through the pivot connection between the upper hinge member 130 and the lower hinge member 110, the upper hinge member 130 can rotate upward (as the schematic view in FIG. 4 which shows a state in which the bonnet B is opening but not yet opened to the maximum angle) from the position where the bonnet B is located at the minimum height in the closed state (as the schematic views in FIG. 2 and FIG. 3 which show the bonnet B in the closed state), and finally the bonnet B is completely opened and reaches the first height (as the schematic view in FIG. 5 which shows a state in which the bonnet B is opened to the maximum angle).

In this embodiment, the lower hinge member 110 further includes a plate portion 114 connected between the vehicle body fixing portion 112 and the pivot portion 113. When the bonnet B is in the closed state, the lateral wall portion 114S of the plate portion 114 is located a position opposite to the deviation restricting member 152 in the left-right direction, that is, the lateral wall portion 114S and the deviation restricting member 152 face each other under the circumstances. The plate portion 114 further includes a rear wall portion 114B extending backward from the lateral wall portion 114S. When the bonnet B is in the closed state, the rear wall portion 114B is located in an area overlapping the upper hinge member 130 in the front-rear direction. In other words, when the bonnet B is in the closed state, when viewed in the front-rear direction, the orthographic projection of the upper hinge member 130 in the front-rear direction overlaps with the orthographic projection of the surface of the rear wall portion 114S.

With this structure, when an accident such as a collision or an impact occurs, when the front of the vehicle is subjected to an external force and the external force is transmitted through the bonnet B, the upper hinge member 130 is subjected to the external force in the front-rear direction. Through the configuration of the plate portion 114 of the lower hinge member 110, even if the upper hinge member 130 moves backward, the plate portion 114 can function as a rear-side restricting member, which can stop the upper hinge member 130 from moving further to the rear side, and can also stop the upper hinge member 130 from moving further to the lateral side. As such, it is possible to maintain the position of the bonnet B in the up-down direction and the front-rear direction more effectively and stably.

In this embodiment, the bonnet fixing portion 132 is provided so that when a collision or impact occurs and a safety device (not shown in the drawings) arranged in the engine room is activated, the bonnet fixing portion 132 can move upward in the up-down direction. When at least a part of the front portion of the vehicle body C is subjected to an impact and the impact causes the bonnet B to deform and move upward, as the upper hinge member 130 moves, the bonnet fixing portion 132 can move upward in the up-down direction. With this structure, when the safety device arranged in the engine room is activated, the flip-open mechanism of the bonnet B is activated to flip open the bonnet B. Since the bonnet fixing portion 132 is set to be able to move upward, when the bonnet B is flipped open, the upper hinge member 130 will rotate upward. Under the circumstances, the rotation suppressing portion 150 will function to stably maintain the position of the upper hinge member 130 in the up-down, front-rear, and left-right directions, thereby effectively enhancing the position retention effect for the bonnet B.

In the embodiment, when the bonnet B is in the closed state, the deviation restricting member 152 is set to be located at the inner side of the upper hinge member 130 in the left-right direction or the outer side of the upper hinge member 130 in the left-right direction. In the drawings of this embodiment, it is exemplified that the deviation restricting member 152 is provided at the inner side of the upper hinge member 130 in the left-right direction. In this example, when the bonnet B is in the closed state, the lateral wall portion 114 of the plate portion 114 of the lower hinge member 110 is arranged at a position closer to the outer side of the vehicle body C in the left-right direction and opposite to the deviation restricting member 152 in the left-right direction.

When an accident such as a collision or an impact occurs and the front of the vehicle is subjected to external forces in the front-rear direction, as shown in FIG. 2 and FIG. 3, since the deviation restricting member 152 is located at one side of the upper hinge member 130, the deviation restricting member 152 can provide support for the deformed upper hinge member 130 from the lateral side of the upper hinge member 130. Therefore, when an accident such as a collision or an impact occurs, the deviation restricting member 152 can effectively suppress upper hinge member 130 from moving in the left-right direction, so that the position of the bonnet B in the left-right direction can be stably maintained.

In this embodiment, the deviation restricting member 152 and the lower hinge member 110 are directly connected. For example, the bottom of the deviation restricting member 152 is directly connected to the vehicle body fixing portion 112 of the lower hinge member 110, so as to fix the deviation restricting member 152 and the lower hinge member 110. The fixing method may be performed by using screw locking, a riveting method, a welding method, or the like, and the disclosure is not limited thereto. By directly connecting the deviation restricting member 152 and the lower hinge member 110, the lower hinge member 110 and the deviation restricting member 152 are integrated as a whole, and the movement of the bonnet B in the left-right direction can be suppressed more firmly.

As shown in FIG. 2 and FIG. 3, in this embodiment, the rotation suppressing portion 150 further includes a connecting component 154 that crosses or straddles the upper hinge member 130 and connects the lower hinge member 110 and the deviation restricting member 152. The connecting component 154 is, for example, a C-shaped rod member, and is connected to the lower hinge member 110 and the deviation restricting member 152 respectively from both ends of the connecting component 154, so that the connecting component 154 is fixed on the lower hinge member 110 and the deviation restricting member 152. The fixing method may be performed by using a welding method or a joining method, and the disclosure is not limited thereto. While crossing the upper hinge member 130, the connecting component 154 also connects the lower hinge member 110 and the deviation restricting member 152 to combine the lower hinge member 110, the deviation restricting member 152 and the connecting component 154 as a whole. With this configuration, it is possible to stop the upper hinge member 130 from rotating upward due to deformation caused by an external force when an accident such as a collision or an impact occurs. In this manner, the movement of the bonnet can be firmly suppressed.

In addition, an opening portion 156 crossing the upper hinge member 130 is formed on the connecting component 154. As shown in FIG. 3, the connecting component 154 is, for example, a C-shaped rod. An upper edge of the opening portion 156 is formed with a constricted portion 155 through which the opening portion 156 is constricted toward the inside. As such, by forming the constricted portion 155 through which the opening portion 156 is constricted toward the inside at the upper edge of the opening portion 156 of the connecting component 154, the width of the opening portion 156 of the connecting component 154 in the left-right direction is not uniform in the up-down direction and the width changes. In the connecting component 154 shown in FIG. 3, the width of the opening portion 156 at the bottom is the widest, and the width of the opening portion 156 at the top is the narrowest. Compared with the shape of the connecting component whose width is consistent from bottom to top, by forming the upper edge into the constricted portion 155 with a narrowed width, when an impact occurs, it is possible to further restrict the movement amount of the upper hinge member 130 in the left-right direction when the upper hinge member 130 moves upward due to the impact. In addition, since the upper edge is formed as a constricted portion 155, the length of the connecting component 154 can be reduced compared to a connecting component that is not provided with a constricted portion and has a consistent width. Even if the upper hinge member 130 moves upward excessively, since the connecting component 154 provided with the constricted portion 155 has a length that can no longer be extended easily, the connecting component can suppress the upper hinge member 130 from moving upward in a more effective way.

Moreover, in the bonnet hinge structure 100 as shown in FIG. 3, the upper hinge member 130 is provided with a bracket portion 134 for fixing the bonnet B, a pivot end 133 for pivoting with the lower hinge member 110, and an arm portion 135 connected between the bracket portion 134 and the pivot end 133. A reinforcing member (a reinforcing component) 135S is arranged on the arm portion 135. With this structure, the upper hinge member 130 is configured to be composed of the bracket portion 134, the pivot end 133, and the arm portion 135 connected between the bracket portion 134 and the pivot end 133, and the reinforcing member 135S arranged on the arm portion 135 further improves the rigidity of the upper hinge member 130. Therefore, when the bonnet B bounces up (as shown in FIG. 4), or when the arm portion 135 of the upper hinge member 130 coming into contact with the connecting component 154 (as shown in FIG. 5) is deformed, the further movement of the bonnet B caused by the above actions can be suppressed. In this manner, the position of the bonnet B can be stably retained.

Figure 6:
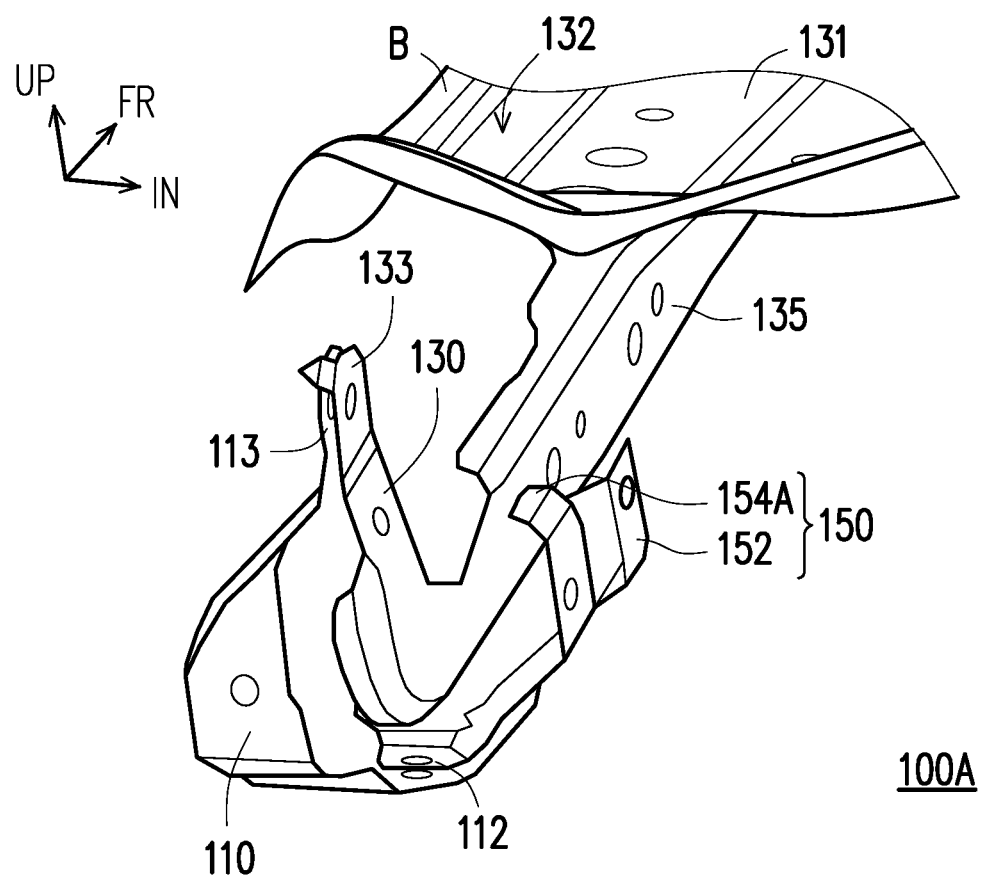
FIG. 6 is a schematic view showing a bonnet hinge structure according to another embodiment of the disclosure.
Figure 7:
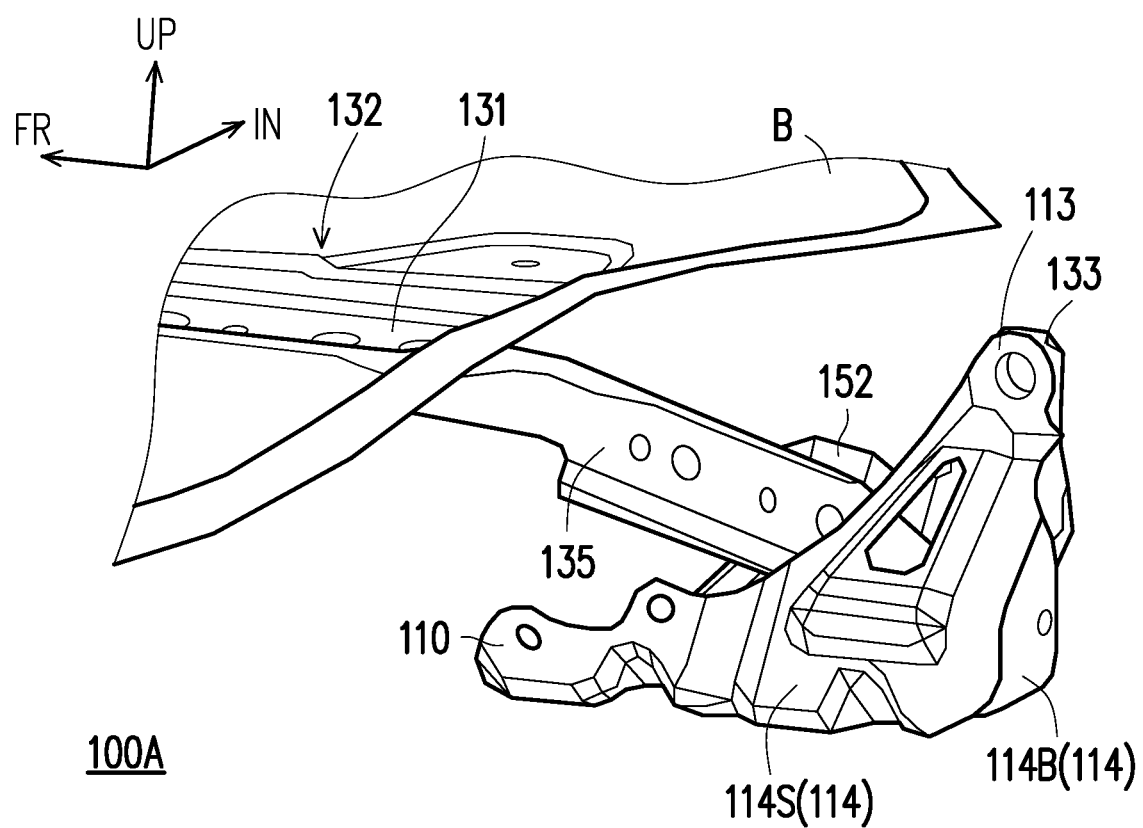
FIG. 7 is a schematic view of the bonnet hinge structure of FIG. 6 viewed from another angle.

FIG. 6 is a schematic view showing a bonnet hinge structure according to another embodiment of the disclosure. FIG. 7 is a schematic view of the bonnet hinge structure of FIG. 6 viewed from another angle. The difference between the bonnet hinge structure 100A in this embodiment and the bonnet hinge structure 100 in the above-mentioned embodiment is that, in this embodiment, the deviation restricting member 152 of the rotation suppressing portion 150 of the bonnet hinge structure 100A is configured as an integrally formed member. In other words, in the deviation restricting member 152 in this embodiment, the deviation restricting member 152 is not provided with the connecting component 154 described in the above-mentioned embodiment, but a bent portion 154A is integrally formed on the upper side of the deviation restricting member 152, and the bent portion 154A performs the same function as the connecting component 154. When a collision or impact occurs and the upper hinge member 130 is deformed by an external force, the bent portion 154A restricts the amount of movement of the upper hinge member 130 moving upward in the left-right direction. In this way, the deviation restricting member 152 is provided as an integrally formed member with a bent portion 154A arranged on its upper side, and the upper hinge member 130 can be suppressed from moving in the up-down direction from the top. As such, the rotation suppressing portion 150 can be easily manufactured, and the number of parts can be reduced, thereby simplifying the assembly process and reducing costs.

Figure 8:
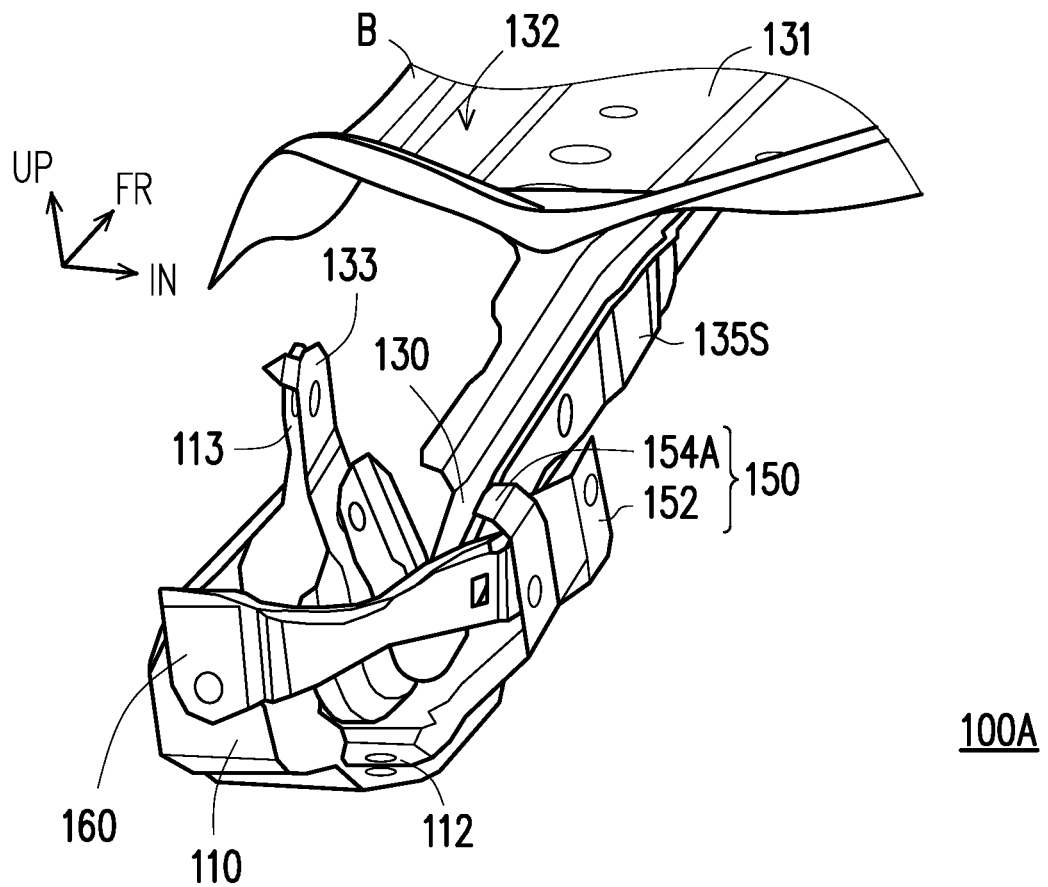
FIG. 8 is a schematic view of another example of the bonnet hinge structure of FIG. 6.

In addition, FIG. 8 is a schematic view of another example of the bonnet hinge structure of FIG. 6. The bonnet hinge structure 100A is schematically shown as an example in the drawing. In the bonnet hinge structure 100A shown in FIG. 8, similar to the bonnet hinge structure 100 shown in FIG. 3, the arm portion 135 of the upper hinge member 130 of the bonnet hinge structure 100A can also be provided with a reinforcing member 135S. With this configuration, the reinforcing member 135S disposed on the arm portion 135 further increases the rigidity of the upper hinge member 130. Therefore, it is possible to suppress the further movement of the bonnet B caused by the deformation of the arm portion 135 of the upper hinge member 130 when the bonnet B bounces up, thereby stably holding the position of the bonnet B.

In addition, as shown in FIG. 8, the bonnet hinge structure 100A may further include a reinforcing plate 160 to further enhance the rigidity and strength of the bonnet hinge structure 100A. One end of the reinforcing plate 160 may be fixed to the deviation restricting member 152, and the other end of the reinforcing plate 160 may be fixed to the plate portion 114 of the lower hinge member 110. In other words, the configuration of the reinforcing plate 160 is to fix both ends of the reinforcing plate 160 to the deviation restricting member 152 and the plate portion 114 of the lower hinge member 110 respectively, so as to improve the overall rigidity and strength of the bonnet hinge structure 100A.

According to the disclosure, when an accident such as a collision or an impact occurs and an external force is applied to the front of the vehicle, the external force is transmitted through the bonnet, so that the upper hinge member is subjected to the external force in the front-rear direction. Accordingly, the upper hinge member will move in the lateral direction (that is, in the left-right direction of the vehicle body) due to deformation. With this movement, even if the upper hinge member rotates upward, through the function performed by the deviation restricting member of the rotation suppressing portion, it is possible to prevent the upper hinge member from further rotating upward. In this manner, it is possible to effectively hold the position of the bonnet in the up-down direction and the front-rear direction stably.

Furthermore, in the disclosure, when the bonnet is in the closed state, the deviation restricting member is located at the inner side in the left-right direction or the outer side in the left-right direction of the upper hinge member.

In the structure, when an accident such as a collision or an impact occurs and the front of the vehicle is subjected to an external force in the front-rear direction, by setting the deviation restricting member on one side of the upper hinge member, the deviation restricting member can provide support for the deformed upper hinge member from the lateral side of the upper hinge member. Accordingly, it is possible to effectively suppress the movement of the upper hinge member in the left-right direction, so that the position of the bonnet in the left-right direction can be stably maintained. When an accident such as a collision or an impact occurs and the vehicle is subjected to external forces in the left-right direction from the lateral side in the left-right direction, since the deviation restricting member provides support for the deformed upper hinge member from the lateral side of the upper hinge member, it is possible to effectively restrain the upper hinge member from moving in the left-right direction. As such, the position of the bonnet in the left-right direction can be maintained stably.

Moreover, in the disclosure, the deviation restricting member and the lower hinge member are directly connected.

In the structure, by directly connecting the deviation restricting member and the lower hinge member, the lower hinge member and the deviation restricting member are integrated, so that the movement of the bonnet in the left-right direction can be held more firmly.

In addition, in the disclosure, the rotation suppressing portion is provided with a connecting component that crosses the upper hinge member and connects the lower hinge member and the deviation restricting member.

In the structure, by using the connecting component to cross the upper hinge member and connecting the lower hinge member and the deviation restricting member, the lower hinge member, the deviation restricting member and the connecting component are combined as a whole to block the upper hinge member, thereby firmly restraining the movement of bonnet.

Furthermore, in the disclosure, an opening portion that crosses the upper hinge member is formed on the connecting component, and an upper edge of the opening portion is formed with a constricted portion through which the opening portion is constricted toward the inside.

In the structure, by forming the constricted portion through which the opening portion is constricted toward the inside at the upper edge of the opening portion of the connecting component, the width of the opening portion of the connecting component in the left-right direction is not uniform in the up-down direction and the width changes. The width of the opening portion at the bottom is the widest, and the width of the opening portion at the top is the narrowest. Compared with the shape of the connecting component whose width is consistent from bottom to top, by forming the upper edge into the constricted portion with a narrowed width, when an impact occurs, it is possible to further restrict the movement amount of the upper hinge member in the left-right direction when the upper hinge member moves upward due to the impact. In addition, since the upper edge is formed as a constricted portion, the length of the connecting component can be reduced compared to a connecting component that is not provided with a constricted portion and has a consistent width. Even if the upper hinge member moves upward excessively, since the connecting component provided with the constricted portion has a length that can no longer be extended easily, the connecting component can suppress the upper hinge member from moving upward in a more effective way.

Also, in the disclosure, the deviation restricting member of the rotation suppressing portion is an integrally formed member.

In the structure, a deviation restricting member that can restrain the movement of the upper hinge member in the up-down direction from above while being able to restrain the movement of the upper hinge member in the left-right direction from the lateral side is configured as an integrally formed member. As such, the number of parts can be reduced, thereby simplifying the assembly process and reducing the cost.

Also, in the disclosure, the rotation suppressing portion includes a bent portion formed at the upper side of the deviation restricting member.

In the structure, the deviation restricting member is integrally formed, and the bent portion capable of suppressing the movement of the upper hinge member in the up-down direction from above is directly formed at the upper side of the deviation restricting member, so that the rotation suppressing portion can be easily manufactured.

Furthermore, in the disclosure, when at least a part of the front portion of the vehicle body is subjected to an impact, which causes the bonnet to deform and move upward, as the upper hinge member moves, the bonnet fixing portion can move upward in the up-down direction.

In the structure, when the flip-open mechanism of the bonnet is activated to flip open the bonnet, since the bonnet fixing portion is set to be able to move upward, when the bonnet is flipped open, the upper hinge member will rotate upward. Under the circumstances, the rotation suppressing portion will function to stably hold the position of the upper hinge member in the up-down, front-rear, and left-right directions, thereby effectively enhancing the position retention effect for the bonnet.

Also, in the disclosure, the upper hinge member has a bracket portion for fixing the bonnet, a pivot end for pivotally connecting with the lower hinge member, and an arm portion connected between the bracket portion and the pivot end. The arm portion is provided with a reinforcing member.

In the structure, the upper hinge member is configured to be composed of the bracket portion, the pivot end, and the arm portion connected between the bracket portion and the pivot end. Moreover, the reinforcing member disposed on the arm portion further improves the rigidity of the upper hinge member. In this manner, it is possible to suppress further movement of the bonnet caused by the deformation of the arm portion of the upper hinge member when the bonnet bounces up, so that the position of the bonnet can be stably maintained.

Furthermore, in the disclosure, the lower hinge member has a vehicle body fixing portion for fixing to the vehicle body, a pivot portion for pivotally connecting with the upper hinge member, and a plate portion connected between the vehicle body fixing portion and the pivot portion. When the bonnet is in the closed state, the lateral wall portion of the plate portion is located at a position opposite to the deviation restricting member in the left-right direction. The rear wall portion of the plate portion extending from the lateral wall portion is located in an area overlapping the upper hinge member in the front-rear direction.

In the structure, when an accident such as a collision or an impact occurs, when the front of the vehicle is subjected to an external force and the external force is transmitted through the bonnet, the upper hinge member is subjected to the external force in the front-rear direction. Through the plate portion of the lower hinge member, even if the upper hinge member moves backward, the plate portion can function as a rear-side restricting member, which can stop the upper hinge member from moving further to the rear side, and can also stop the upper hinge member from moving further to the lateral side. As such, it is possible to maintain the position of the bonnet in the up-down direction and the front-rear direction more effectively and stably.

Based on the above, the bonnet hinge structure of the disclosure can stably hold the position of the bonnet in all directions regardless of the external force coming from the front-rear direction or the left-right direction in the event of a collision or impact.

In summary, for the bonnet hinge structure 100 of the disclosure, when an accident such as a collision or an impact occurs, regardless of whether the external force comes from the front-rear direction or the left-right direction, due to the arrangement of the rotation suppressing portion 150 composed of the deviation restricting member 152 and the connecting component 154, the bonnet B can be held stably in position in all directions. In addition, for the bonnet hinge structure 100A of the disclosure, in the event of a collision or an impact, regardless of whether the external force comes from the front-rear direction or the left-right direction, because of the arrangement of the rotation suppressing portion 150 composed of the deviation restricting member 152 with the integrally formed bent portion 154A, the bonnet B can be held in position stably in all directions.

The embodiments of the disclosure have been described above, but the disclosure can be modified in various designs without departing from the spirit of the disclosure. For example, in the disclosure, an individual connecting component 154 that crosses the upper hinge member 130 and connects the lower hinge member 110 and the deviation restricting member 152 is provided, but the connecting component 154 may be provided to be integrally formed with at least one of the lower hinge member 110 and the deviation restricting member 152.

What is claimed is:

1. A bonnet hinge structure, which pivotally supports a bonnet to a vehicle body from a rear end of the bonnet, and the bonnet hinge structure comprising:
    a lower hinge member, fixed to the vehicle body;
    an upper hinge member, fixed to a bonnet fixing portion of the bonnet, and pivotally connected to the lower hinge member in a manner of being able to rotate to a first height relative to the lower hinge member in an up-down direction of the vehicle body; and
    a rotation suppressing portion, provided with a deviation restricting member, wherein when the upper hinge member is deformed in a left-right direction of the vehicle body, the deviation restricting member is in contact with the upper hinge member at a position of a second height that is lower than the first height from a top of the upper hinge member, and prevents the upper hinge member from rotating;

wherein, the rotation suppressing portion is provided with a connecting component that crosses the upper hinge member and connects the lower hinge member and the deviation restricting member; and wherein, an opening portion that crosses the upper hinge member is formed on the connecting component, and an upper edge of the opening portion is formed with a constricted portion through which the opening portion is limited toward the inside.

2. The bonnet hinge structure according to claim 1, wherein, when the bonnet is in a closed state, the deviation restricting member is located at an inner side in the left-right direction or an outer side in the left-right direction of the upper hinge member.

3. The bonnet hinge structure according to claim 1, wherein, the deviation restricting member and the lower hinge member are directly connected.

4. The bonnet hinge structure according to claim 1, wherein, the deviation restricting member of the rotation suppressing portion is an integrally formed single component.

5. The bonnet hinge structure according to claim 1, wherein, when at least a part of a front portion of the vehicle body is subjected to an impact, which causes the bonnet to deform and move upward, as the upper hinge member moves, the bonnet fixing portion is able to move upward in the up-down direction.

6. The bonnet hinge structure according to claim 5, wherein, the upper hinge member has a bracket portion for fixing the bonnet, a pivot end for pivotally connecting with the lower hinge member, and an arm portion connected between the bracket portion and the pivot end, and the arm portion is provided with a reinforcing member.

7. The bonnet hinge structure according to claim 1, wherein, the lower hinge member has a vehicle body fixing portion for fixing to the vehicle body, a pivot portion for pivotally connecting with the upper hinge member, and a plate portion connected between the vehicle body fixing portion and the pivot portion, when the bonnet is in a closed state, a lateral wall portion of the plate portion is located at a position opposite to the deviation restricting member in the left-right direction, a rear wall portion of the plate portion extending from the lateral wall portion is located in an area overlapping the upper hinge member in a front-rear direction.

* * * * *